United States Patent
Serravalle et al.

(10) Patent No.: US 9,560,569 B2
(45) Date of Patent: *Jan. 31, 2017

(54) COMMUNICATION SYSTEM (71) Applicant: NEC Corporation, Tokyo (JP)

(72) Inventors: Francesca Serravalle, Tokyo (JP);
Robert Paterson, Tokyo (JP); Robert
Tietz, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/793,425

(22) Filed: Jul. 7, 2015

(65) Prior Publication Data
US 2015/0312828 A1 Oct. 29, 2015

Related U.S. Application Data (63) Continuation of application No. 13/816,215, filed as application No. PCT/JP2011/068718 on Aug. 12, 2011, now Pat. No. 9,107,129.

(30) Foreign Application Priority Data

Aug. 12, 2010 (GB) .................................. 1013559.8

(51) Int. Cl.
*H04W 72/00* (2009.01)
*H04W 36/22* (2009.01)
(Continued)

(52) U.S. Cl.
CPC ............. *H04W 36/22* (2013.01); *H04B 7/155* (2013.01); *H04W 28/0247* (2013.01);
(Continued)

(58) Field of Classification Search
CPC ............... H04W 84/047; H04W 88/04; H04W 36/0055; H04W 92/20; H04W 36/22; H04W 24/02; H04W 28/08; H04W 92/045; H04W 72/04; H04W 16/08; H04W 24/04; H04W 28/02; H04W 88/16
(Continued)

(56) References Cited

U.S. PATENT DOCUMENTS 9,107,129 B2 * 8/2015 Serravalle .............. H04B 7/155
2009/0318161 A1 12/2009 Lopes
(Continued)

FOREIGN PATENT DOCUMENTS

CN 101500271 A 8/2009
GB 2461500 A 1/2010
(Continued)

OTHER PUBLICATIONS

International Search Report in PCT/JP2011/068718 dated Nov. 14, 2011 (English Translation Thereof).
(Continued)

Primary Examiner — Olumide T Ajibade Akonai
(74) Attorney, Agent, or Firm — Wilmer Cutler Pickering Hale and Dorr LLP (57) ABSTRACT A relay communications system is described in which a base station receives a request from an MME that an overload procedure be started or stopped. The base station inserts the identity of the MME into the request and forwards the modified request to a relay node. The relay node then initiates or terminates the overload procedure in accordance with the request for mobile telephones which the MME that made the request serves, but not for mobile telephones which the MME does not serve.

13 Claims, 7 Drawing Sheets (51) Int. Cl.
*H04W 28/02* (2009.01)
*H04B 7/155* (2006.01)
*H04W 28/08* (2009.01)
*H04B 7/26* (2006.01)
*H04W 8/26* (2009.01)
*H04W 84/04* (2009.01)
*H04W 88/08* (2009.01)

(52) U.S. Cl.
CPC ........... *H04W 28/08* (2013.01); *H04B 7/2606* (2013.01); *H04W 8/26* (2013.01); *H04W 28/0289* (2013.01); *H04W 84/047* (2013.01); *H04W 88/08* (2013.01)

(58) Field of Classification Search
USPC ....... 455/422.1, 423, 424, 450, 453, 7, 11.1, 455/13.1, 560
See application file for complete search history.

(56) References Cited

U.S. PATENT DOCUMENTS

| | | |
|---|---|---|
| 2010/0120399 A1 | 5/2010 | Guo et al. |
| 2010/0311419 A1 | 12/2010 | Bi |
| 2011/0151774 A1 | 6/2011 | Li et al. |
| 2011/0194484 A1 | 8/2011 | Lee et al. |
| 2011/0269499 A1 | 11/2011 | Vikberg et al. |
| 2011/0280127 A1 | 11/2011 | Raaf et al. |
| 2011/0292799 A1 | 12/2011 | Dottling et al. |
| 2012/0039299 A1 | 2/2012 | Teyeb et al. |

FOREIGN PATENT DOCUMENTS

| | | |
|---|---|---|
| RU | 2181229 C1 | 4/2002 |
| WO | WO-2009/115041 A1 | 9/2009 |
| WO | WO-2010/020953 A1 | 2/2010 |
| WO | WO-2010/051830 A1 | 5/2010 |
| WO | WO-2010/080056 A1 | 7/2010 |
| WO | WO-2010/086023 A1 | 8/2010 |

OTHER PUBLICATIONS

3GPP TS 23.401 Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 9), V9.5.0 (Jun. 2010).
3GPP TS 36.401, Technical Specification, 3rd Generation Partnership Project; Technical Specification Group Radio Access Network; Evolved Universal Terrestrial Radio Access Network (E-UTRAN); Architecture description (Release 9), V9.2.0 (Jun. 2010).
3GPP TS 36.413, Technical Specification, 3rd Generation Partnership Project; Technical Specification Group Radio Access Network; Evolved Universal Terrestrial Radio Access Network (E-UTRAN); S1 Application Protocol (S1AP) (Release 9), V9.3.0(Jun. 2010).
3GPP TS 36.300, Technical Specification, 3rd Generation Partnership Project; Technical Specification Group Radio Access Network; ; Evolved Universal Terrestrial Radio Access (E-UTRA) and Evolved Universal Terrestrial Radio Access Network (E-UTRAN); Overall description Stage 2 (Release 10), V10.0.0 (Jun. 2010).

\* cited by examiner

COMMUNICATION SYSTEM

CROSS-REFERENCE TO RELATED APPLICATIONS

This application is a Continuation Patent Application of U.S. patent application Ser. No. 13/816,215, filed Feb. 8, 2013, which is a national stage application of International Application No. PCT/JP2011/068718 entitled "Communication System," filed on Aug. 12, 2011, which claims the benefit of the priority of United Kingdom Patent Application No. 1013559.8, filed on Aug. 12, 2010, the disclosures of each of which are hereby incorporated by reference in their entirety.

TECHNICAL FIELD

The present invention relates to a communication system and to components thereof for providing relay services to mobile or fixed communication devices. The invention has particular but not exclusive relevance to relay services used in LTE-Advanced as currently defined in 3GPP standards documentation TS 36.413 V 9.3.0 and TS 36-300 V 10.0.0.

BACKGROUND ART

Relaying is considered for LTE-Advanced as a tool to improve, for example, the coverage of high data rates for User Equipment (UE), group mobility, temporary network deployment, the cell edge throughput and/or to provide coverage in new cell areas. E-UTRAN supports relaying by having a Relay Node (RN) wirelessly connected to a base station (eNB) (referred to as a Donor eNB (DeNB)). In addition to serving its own 'donor' cell, the Donor eNB serves the RN, via a modified version of the E-UTRA radio interface. The modified interface is referred to as the 'Un' interface.

Each RN is provided with many aspects of a base station's functionality and is therefore capable of acting as a base station serving its own 'relay' cell. From the perspective of the user equipment in the relay cell, therefore, the RN essentially appears to be a conventional LTE base station. In addition to the base station functionality, however, the RN also supports a subset of the UE functionality including, for example, many aspects of the physical layer, layer-2, radio resource control (RRC), and non access stratum (NAS) functionality, to allow it to connect wirelessly to a Donor eNB.

Several mobility management entities (MMEs) are located in the core of the E-UTRA network. Each MME serves a respective subset of the user equipment in the 'donor' cell of the Donor eNB, the relay cell, and/or other cells in the wider network. The Donor eNB forwards control messages received from the MME to the RN over the Un interface and, from the perspective of the RN, the Donor eNB appears to be a single MME that serves all the items of user equipment registered with the RN in the relay cell.

Accordingly, the Donor eNB is capable of handling communication both 'directly' to and from user equipment camped in its own cell and 'indirectly', via the RN, to and from user equipment camped in the relay cell.

The MMEs in the core network can become overloaded and, accordingly, each MME is provided with an overload handling capability. Specifically, when one of the MMEs experiences an overload situation, it randomly selects a subset of the base stations that it communicates with, and sends the selected base station(s) a control message to request initiation of a procedure to alleviate the overload situation. Typically, for example, the requested overload procedure will involve the base station rejecting attempts to establish a connection made by user equipment served by the MME making the request.

SUMMARY OF THE INVENTION

The inventors have, however, realised that there is a problem with this arrangement. In particular, when a Donor eNB receives an overload initiation message from an MME it initiates the overload procedure for user equipment in its own donor cell. The Donor eNB also forwards the overload initiation message to the RN. However, because the Donor eNB appears, to the RN, to be a single MME that serves all the user equipment in the relay cell, the relay node responds to the overload message by initiating the overload procedure for all the user equipment camped in its relay cell. Thus, in addition to rejecting attempts to establish a connection made by user equipment served by the overloaded MME, the relay node will also reject connection attempts made by user equipment served by other MMEs regardless of whether the other MMEs are overloaded or not. Thus, attempts by user equipment in the relay cell to establish a connection via the RN may be rejected unnecessarily. This can result in an undesirably high incidence of connection rejections in the relay cell.

The present invention aims to provide an improved communication system and improved components of the communication system which overcome or at least alleviate the above issues.

Accordingly one aspect of the present invention provides a relay node for a communication system, the relay node comprising: means for associating a plurality of mobile devices with the relay node; means for receiving, from a base station, a request that an overload action be performed and identity information representing an identity of a network entity that requested the overload action; and means for selectively performing said requested overload action in respect of the mobile devices associated with the relay node in dependence on whether or not the mobile devices are served by the network entity having the identity represented by the identity information.

The requested overload action may comprise initiating an overload procedure. The request for initiating an overload procedure may comprise overload start message (e.g. an S1 AP: Overload Start Message).

The network entity may comprise a mobility management entity (MME).

The overload procedure may comprise receiving a request to establish a connection from a mobile telephone associated with the relay node, may comprise determining whether or not the mobile telephone that made the request is served by the network entity having the identity represented by the identity information, may comprise generating a message for rejecting said request to establish a connection or generating a message for accepting said request to establish a connection in dependence on whether or not the mobile telephone that made the request is served by the network entity having the identity represented by the identity information, and/or may comprise transmitting said generated message to the mobile telephone that made the request to establish a connection.

The overload procedure initiated by the performing means may further comprise determining a reason for the requested connection establishment request, and wherein said generation step may further comprise generating said message for rejecting said request to establish a connection or generating said message for accepting said request to establish a connection in dependence on said determined reason for the requested connection.

The requested overload action may comprise terminating an overload procedure. The request for terminating an overload procedure may comprise overload stop message (e.g. an S1 AP: Overload Stop Message)

Another aspect of the present invention provides a base station for a communication system, the base station comprising: means for receiving, from a network entity, a request that an overload action be performed; means for generating identity information representing an identity of the network entity that requested the overload action; and means for transmitting, to a relay node, the request that the overload action be performed and the information representing an identity of the network entity that requested the overload action.

The base station may further comprise means for inserting said information representing an identity of the network entity that requested the overload action into said request that the overload action be performed, whereby said information representing an identity of the network entity that requested the overload action may be transmitted as part of said request that the overload action be performed.

The request that the overload action be performed may comprise a request for an overload procedure to be initiated (e.g. an Overload Start message).

The request that the overload action be performed may comprise a request for an overload procedure to be terminated (e.g. an Overload Stop message).

According to another aspect of the invention there is provided a network entity for a communication system, the network entity comprising: means for determining that an overload situation has occurred; means for generating, in response to determining that an overload situation has occurred, a request that an overload action be performed, said request comprising information representing an identity of the network entity (e.g. in an information element such as an MME ID IE); and means for transmitting, to a base station, the request that the overload action be performed.

According to another aspect of the invention there is provided a method performed by a relay node in a communication system, the method comprising: associating a plurality of mobile devices with the relay node; receiving, from a base station, a request that an overload action be performed and identity information representing an identity of a network entity that requested the overload action; and selectively performing said requested overload action in respect of the mobile devices associated with the relay node in dependence on whether or not the mobile devices are served by the network entity having the identity represented by the identity information.

According to another aspect of the invention there is provided a method performed by a base station in a communication system, the method comprising: receiving, from a network entity, a request that an overload action be performed; generating identity information representing an identity of the network entity that requested the overload action; and transmitting, to the relay node, the request that the overload action be performed and the information representing an identity of the network entity that requested the overload action.

According to another aspect of the invention there is provided a method performed by a network entity for a communication system, the method comprising: determining that an overload situation has occurred; generating, in response to determining that an overload situation has occurred, a request that an overload action be performed, said request comprising information representing an identity of the network entity; and transmitting, to a base station, the request that the overload action be performed.

According to another aspect of the invention there is provided a communications device for a communication system that comprises a plurality of network entities, a base station, a relay node, and a plurality of mobile devices associated with the relay node, the communications device comprising: means for receiving a request that an overload action be performed for at least one of said plurality of network entities; and means for selectively performing said requested overload action in respect of the mobile devices associated with the relay node in dependence on whether or not the mobile devices are served by the network entity for which the overload action has been requested.

The communications device may be said relay node or may be said base station.

The requested overload action may comprise initiating an overload procedure, and said overload procedure may comprise receiving a request to establish a connection from a mobile telephone associated with the relay node, may comprise determining whether or not the mobile telephone that made the request is served by the network entity for which the overload action was requested, may comprise generating a message for rejecting said request to establish a connection or generating a message for accepting said request to establish a connection in dependence on whether or not the mobile telephone that made the request is served by the network entity for which the overload action was requested, and/or may comprise transmitting said generated message to the mobile telephone that made the request to establish a connection.

The requested overload action may comprise initiating an overload procedure, and said overload procedure may comprises receiving an indication that a connection has been established between a mobile telephone associated with the relay node and the relay node, may comprise determining whether or not the mobile telephone for which the connection is established is served by the network entity for which the overload action has been requested, may comprise selectively generating a message for terminating said established connection in dependence on whether or not the mobile telephone for which the connection is established is served by the network entity for which the overload action has been requested, and/or may comprise transmitting any message so generated to the relay node.

The message for terminating said established connection may comprise an error indication and/or may comprise a message for releasing a context of the mobile telephone. A message for releasing a context may comprise a UE Context Release.

According to another aspect of the invention there is provided a method performed by a communications device in a communication system that comprises a plurality of network entities, a base station, a relay node, and a plurality of mobile devices associated with the relay node, the method comprising: receiving a request that an overload action be performed for at least one of said plurality of network entities; and selectively performing said requested overload action in respect of the mobile devices associated with the relay node in dependence on whether or not the mobile devices are served by the network entity for which the overload action is requested.

According to another aspect of the invention there is provided a computer program product comprising computer implementable instructions for causing a programmable computer device to become configured as the relay node, as the base station, as the network entity, or as the communications device.

A preferable embodiment of the invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

The invention also provides corresponding methods and computer software products that may be provided on a carrier signal or on a recording medium.

The text of the abstract filed herewith is repeated here as part of the specification. In an exemplary aspect of the invention of the invention there is provided a relay communications system in which a base station receives a request from an MME that an overload procedure be started or stopped. The base station inserts the identity of the MME into the request and forwards the modified request to a relay node. The relay node then initiates or terminates the overload procedure in accordance with the request for mobile telephones which the MME that made the request serves, but not for mobile telephones which the MME does not serve.

BRIEF DESCRIPTION OF THE DRAWINGS

Embodiments of the invention will now be described, by way of example only, with reference to the attached figures in which.

MODE OF CARRYING OUT THE INVENTION

Overview

Figure 1:
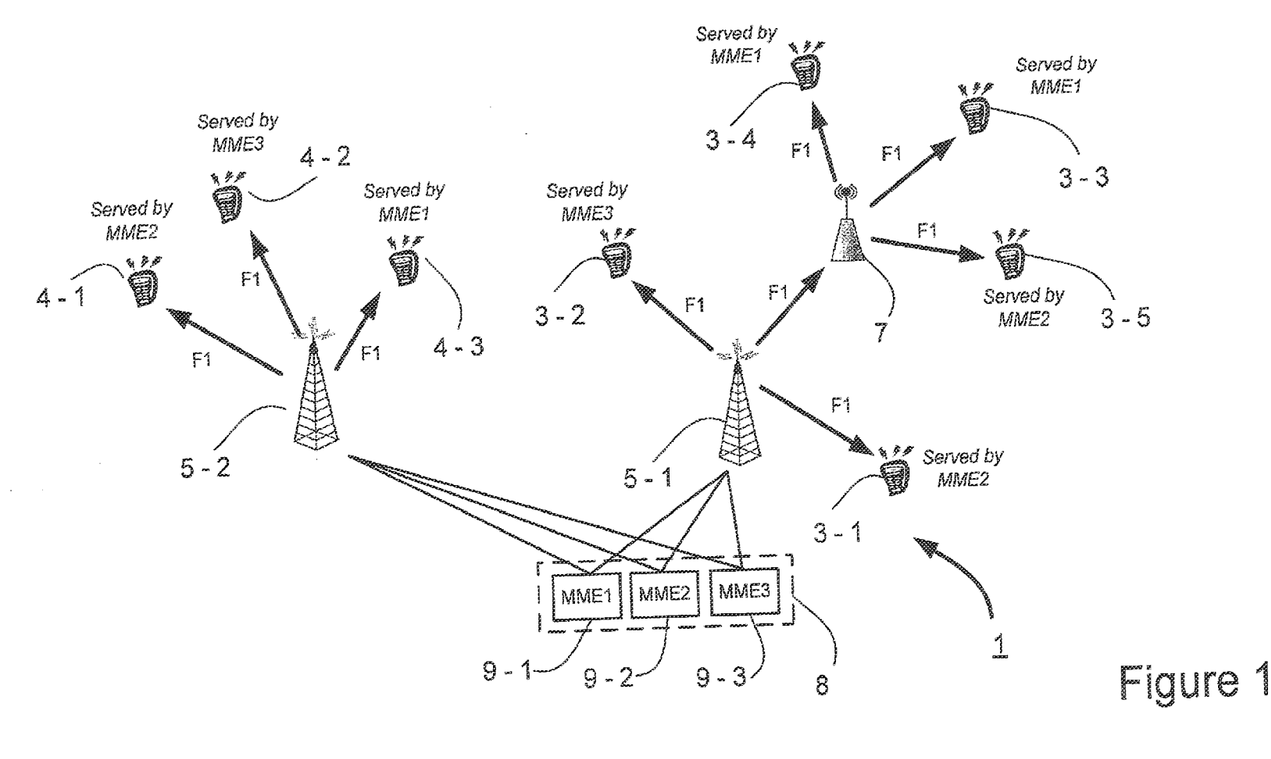
FIG. 1 schematically illustrates a mobile telecommunication system of a type to which the described embodiments are applicable.

FIG. 1 schematically illustrates a mobile (cellular) telecommunication system 1 including user equipment 3, comprising a plurality of mobile telephones 3-1 to 3-5 served by a donor base station 5-1, and user equipment 4 comprising a plurality of other mobile telephones 4-1 to 4-3 served by another base station 5-2. The telecommunication system 1 also comprises a relay node 7 that connects wirelessly to the donor base station 5-1, and a core network 8 including, amongst other things, a plurality of mobility management entities (MMEs) 9-1, 9-2, 9-3 (generally referenced as 9).

Each MME 9 serves a different subset of the mobile telephones 3, 4, via a respective base station 5-1, 5-2. In FIG. 1, for example, mobile telephones 3-3, 3-4 and 4-3 are served by MME 9-1, mobile telephones 3-1, 3-5 and 4-1 are served by MME 9-2, and mobile telephones 3-2 and 4-2 are served by MME 9-3. Each MME 9 may also serve other mobile telephones via other base stations that are not shown in FIG. 1.

Mobile telephones 3-1, 3-2, and 4 (hereafter referred to as Direct MTs) are each registered directly with a respective base station 5-1, 5-2. Mobile telephones 3-3, 3-4 and 3-5 (hereafter referred to as Relay MTs) are registered with the relay node 7. Accordingly, users of mobile telephones 3-1 and 3-2 can communicate with other users via the donor base station 5-1 and the core network 8. Users of mobile telephones 3-3 to 3-5 can communicate with other users via the relay node 7 and the donor base station 5-1 and the core network 8. Users of the other mobile telephones 4 can communicate with other users via the other base station 5-2 and the core network 8.

To help ensure that the communication protocols used by the Relay MTs 3-3, 3-4 and 3-5 and the Direct MTs remain consistent with one another, the relay node 7 effectively appears to be a base station to the Relay MTs 3-3, 3-4 and 3-5. Similarly, the base station 5 effectively appears to be an MME to the relay node 7.

When an MME 9 experiences an overload situation, it randomly selects at least one of the base stations 5 via which the mobile telephones 3, 4 that it serves are registered (either directly via a base station 5 or indirectly via the relay node), to initiate a corresponding overload procedure. The overloaded MME 9 generates an 'overload start' message comprising an indication of the actions required in response to the overload situation, and sends it to the selected base station(s) 5 to request initiation of the corresponding overload procedure. When the overloaded MME 9 is no longer overloaded it generates an 'overload stop' message indicating that the requested overload procedure is no longer required and can therefore be discontinued.

In this embodiment, an MME 9 is able to request initiation of any of three different types of overload procedure by generating an overload start message including information identifying which of the three types of procedure is required. The different overload procedures which can be requested in this manner comprise:

Rejection of all attempts to establish connections for non-emergency mobile originated data transfer;

Rejection of all attempts to establish signalling connections; and

Permitting attempts to establish connections for emergency sessions and mobile terminated services only.

When the donor base station 5-1 has been selected by an MME 9 to initiate an overload procedure, and has received the associated overload start message, it initiates the requested overload procedure in respect of any Direct MTs 3-1 and 3-2 served by the overloaded MME 9. The donor base station 5-1 also inserts information identifying the sending MME 9 into the overload start message and forwards the modified overload start message (including the information identifying the sending MME 9) to the relay node 7. The relay node 7 reads the MME identification information provided with the overload start message and initiates the requested overload procedure only for the specific Relay MTs 3-3, 3-4 and 3-5 served by the overloaded MME 9 represented by the MME identification information read from the overload start message.

Accordingly, the relay node 7 is advantageously able to perform the actions required in response to the overload situation, selectively, for any Relay MTs 3-3 to 3-5 that the overloaded MME 9 serves, whilst any Relay MTs 3-3 to 3-5 served by an MME 9 that is not overloaded, are unaffected.

When the donor base station 5-1 receives an overload stop message it terminates the requested overload procedure in respect of any Direct MTs 3-1, 3-2 served by the MME 9 from which it has received the overload stop message. The donor base station 5-1 also inserts information identifying the sending MME 9 into the overload stop message and forwards the modified overload stop message (including the information identifying the sending MME 9) to the relay node 7. The relay node 7 reads the MME identification information sent with the overload stop message and discontinues the overload procedure only for any Relay MTs 3-3 to 3-5 served by the MME 9 that sent the original overload stop message.

Accordingly, when a relay node 7 is carrying out parallel overload procedures in respect of a plurality of MMEs 9, the relay node 7 is advantageously able to selectively discontinue the overload procedure for mobile telephones 3-3 to 3-5 served by an MME 9 that ceases to be overloaded, without affecting the other parallel overload procedure(s) for other MME(s) 9.

Base Station

Figure 2:
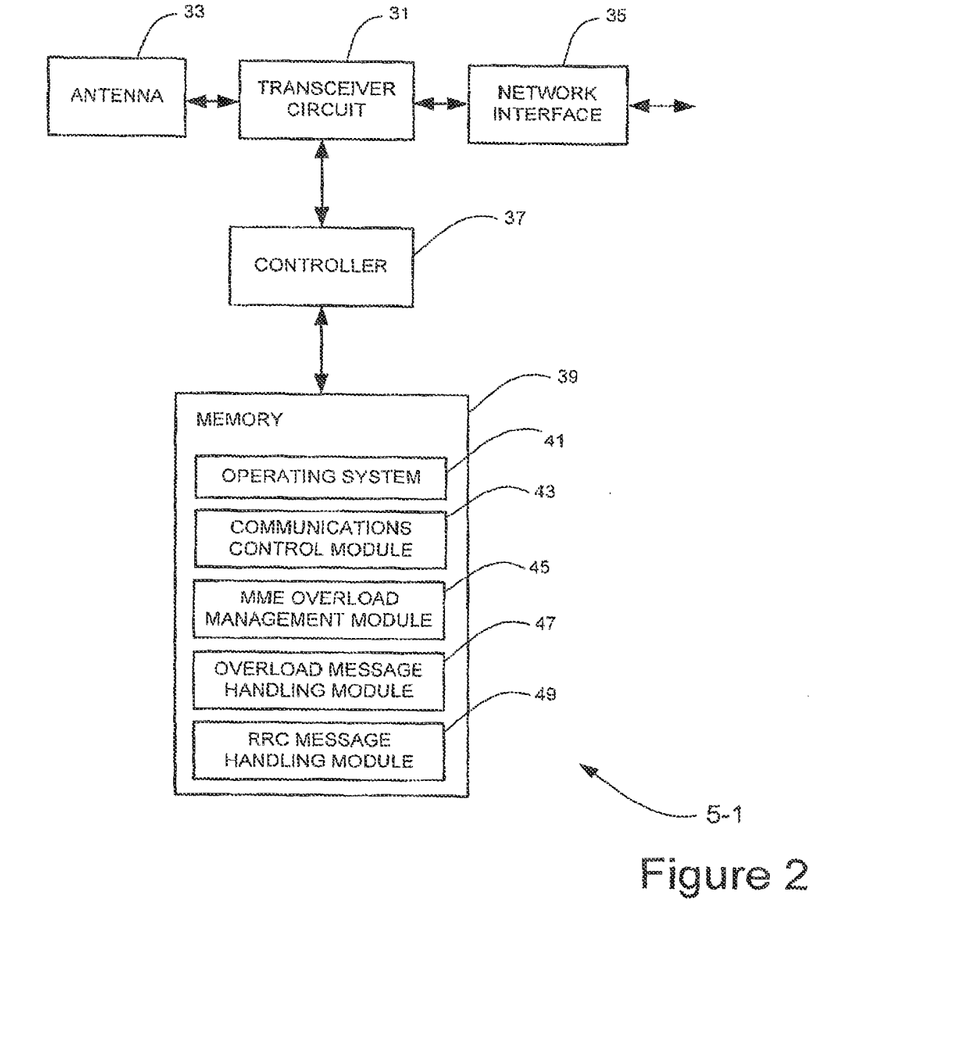
FIG. 2 is a block diagram illustrating the main components of the base station illustrated in FIG. 1.

FIG. 2 is a block diagram illustrating the main components in the donor base station 5-1 shown in FIG. 1. As shown, the donor base station 5-1 includes a transceiver circuit 31 which is operable to transmit signals to, and to receive signals from, the Direct MTs 3-1 and 3-2 and the relay node 7 via at least one antenna 3. The donor base station 5-1 is also operable to transmit signals to and to receive signals from the MMEs 9 of the core network 8 via a network interface 35. The operation of the transceiver circuit 31 is controlled by a controller 37 in accordance with software stored in memory 39.

The software includes, among other things, an operating system 41, a communications control module 43, an MME overload management module 45, an overload message handling module 47, and a Radio Resource Control (RRC) message handling module 49.

The communications control module 43 is operable to control communication with the Direct MTs 3-1 and 3-2 and the relay node 7 including, for example, allocation of resources to be used by the transceiver circuit 31 in its communications with each of the Direct MTs 3-1 and 3-2 and with the relay node 7. The communications control module 43 also schedules the times for the transmission of downlink data to the Direct MTs 3-1 and 3-2 and the relay node 7.

The MME overload management module 45 initiates MME overload procedures, in accordance with the required overload actions indicated in associated overload start messages received from overloaded MMEs 9, in respect of the Direct MTs 3-1 and 3-2 served by the overloaded MMEs 9. Similarly, the MME overload management module 45 terminates MME overload procedures, in accordance with overload stop messages received from MMEs 9 that cease to be overloaded, for the Direct MTs 3-1 and 3-2 served by those MMEs 9.

The overload message handling module 47 receives overload messages (both start and stop messages) and extracts any information required by the MME overload management module 45 to initiate/terminate the MME overload procedures for the Direct MTs 3-1 and 3-2 (e.g. information identifying the type of overload actions required). The overload message handling module 47 also identifies the MME 9 from which each overload message is received, inserts an identifier for the MME 9 which sent the overload message into an MME identification information element provided in the overload message, and forwards the modified message to the relay node 7.

The RRC message handling module 49 handles RRC messages received from the Direct MTs 3-1 and 3-2 by interpreting the RRC messages and responding to the messages appropriately. When an overload procedure has been initiated for an overloaded MME 9, the RRC message handling module 49 responds to RRC connection establishment messages received from Direct MTs 3-1 and 3-2, by determining whether or not the message has been received from a mobile telephone 3 served by the overloaded MME 9. If a message has been received from a mobile telephone 3 served by the overloaded MME 9, then the RRC message handling module 49 responds by generating a corresponding RRC message to reject or permit the connection attempt in dependence on the type of overload procedure requested by the overloaded MME 9 and the reason for the connection establishment message.

Relay Node

Figure 3:
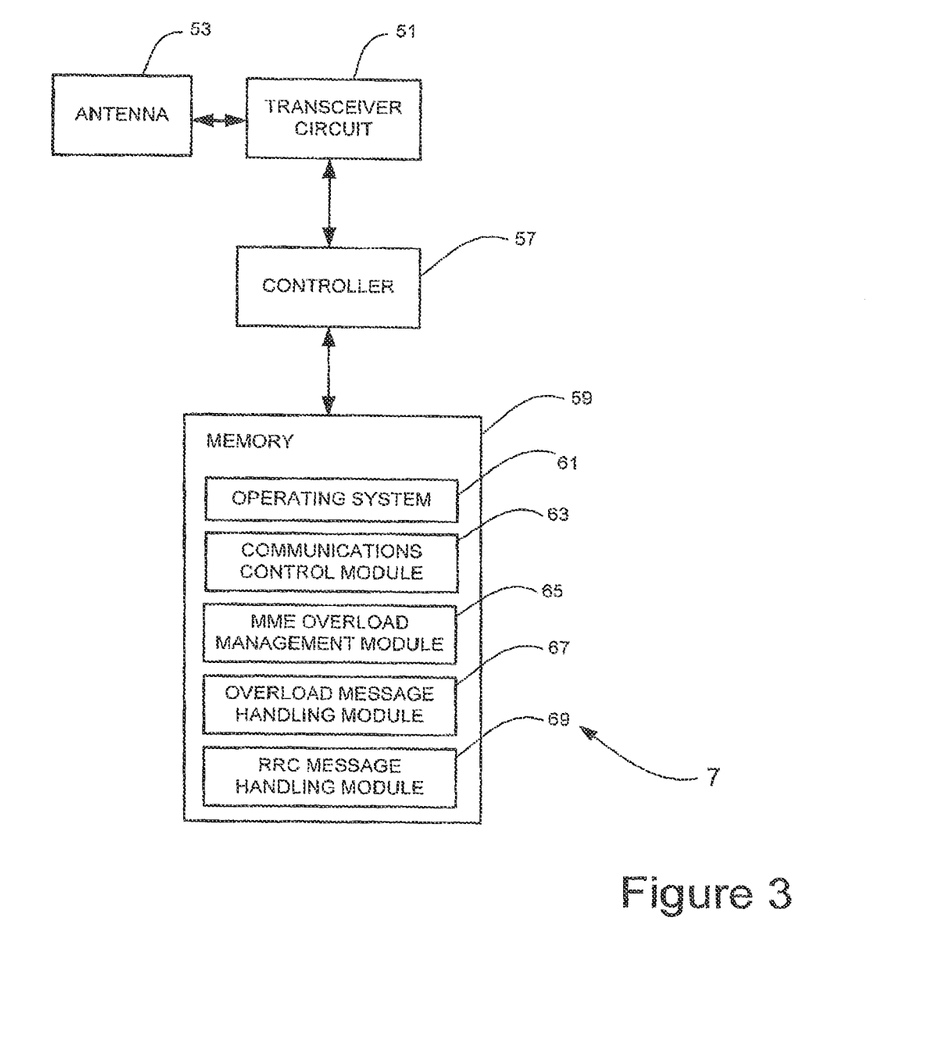
FIG. 3 is a block diagram illustrating the main components of the relay station illustrated in FIG. 1.

FIG. 3 schematically illustrates the main components of the relay node 7 shown in FIG. 1. The relay node 7 may be a fixed communications node like a base station 5 or may itself be a mobile device. Indeed, some mobile telephones 3, 4 may provide relay services and therefore act as relay nodes. As shown, the relay node 7 includes a transceiver circuit 51 which is operable to transmit signals to, and to receive signals from, Relay MTs 3-3 to 3-5 and the base station 5-1 via at least one antenna 53. The operation of the transceiver circuit 51 is controlled by a controller 57 in accordance with software stored in memory 59.

The software includes, among other things, an operating system 61, a communications control module 63, an MME overload management module 65, an overload message handling module 67, and a Radio Resource Control (RRC) message handling module 69.

The communications control module 63 is operable to control communication with the Relay MTs 3-3 to 3-5 and the base station 5-1 including, for example, allocation of resources to be used by the transceiver circuit 51 in its communications with each of the Relay MTs 3 and with the base station 5. The communications control module 63 also schedules the times for the transmission of appropriate sub-frames to relay associated data to the Relay MTs 3-3 to 3-5.

The overload message handling module 67 receives overload messages (both start and stop messages) forwarded by the donor base station 5-1 and extracts the MME identification information from the overload messages. The overload message handling module 67 also extracts any other information required by the MME overload management module 65 to initiate/terminate the MME overload procedures for the Relay MTs 3-3 to 3-5 (e.g. information identifying the type of overload actions required).

The MME overload management module 65 initiates MME overload procedures, in accordance with the required overload actions indicated in associated overload start messages received from the donor base station 5-1, in respect of the Relay MTs 3-3 to 3-5 served by the MMEs 9 identified by the MME identification information contained in the overload start messages. Similarly, the MME overload management module 65 discontinues any MME overload procedures, in accordance with overload stop messages received from the donor base station 5-1, in respect of the Relay MTs 3-3 to 3-5 served by the MMEs 9 identified by the MME identification information contained in the overload stop message.

The RRC message handling module 69 handles RRC messages received from the Relay MTs 3-3 to 3-5 by interpreting the RRC messages and responding to the messages appropriately. When an overload procedure has been initiated for an overloaded MME 9, the RRC message handling module 69 responds to RRC connection establishment messages received from Relay MTs 3-3 to 3-5, by determining whether or not the message has been received from a mobile telephone 3 served by the overloaded MME 9. If a message has been received from a mobile telephone 3 served by the overloaded MME 9, then the RRC message handling module 69 responds by generating a corresponding RRC message to reject or permit the connection attempt in dependence on the type of overload procedure requested by the overloaded MME 9 and the reason for the connection establishment message.

Overload Response Initiation Procedure

Figure 4:
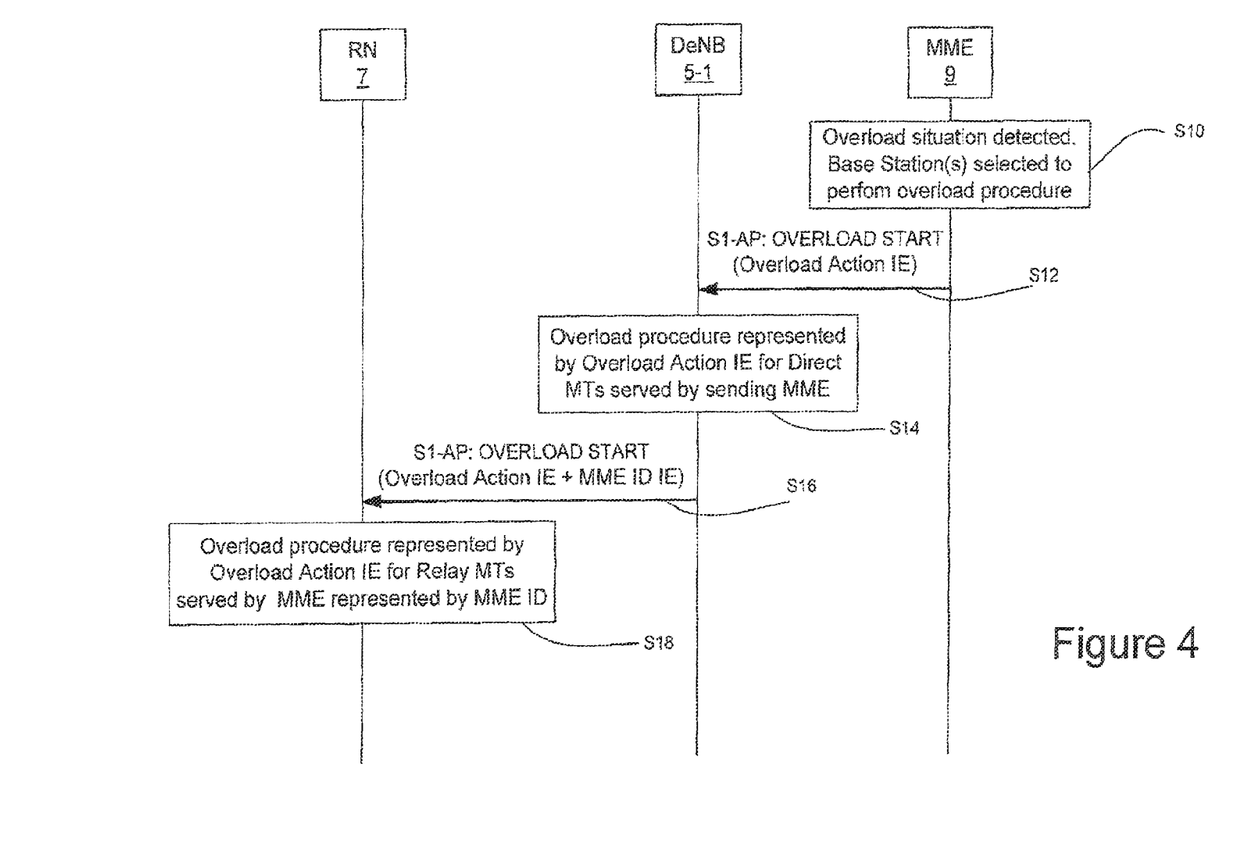
FIG. 4 is a flow diagram illustrating, in general terms, a procedure for initiating a response to an overload situation performed by components of the mobile telecommunication system of FIG. 1.

FIG. 4 illustrates, in general terms, a typical procedure followed by key components of the telecommunication system 1 when an MME 9 experiences an overload situation.

As seen in FIG. 4 when the MME 9 experiences an overload situation, it randomly selects a subset of the base stations that it serves to perform an overload procedure aimed at alleviating the overload situation (S10). The MME 9 also determines what type of overload procedure should be performed by the selected base stations. In the example illustrated in FIG. 4, a donor base station 5 is selected to perform the overload procedure.

The MME 9 generates an overload start message (S1 AP: Overload Start) that includes, amongst other information, an Overload Action information element which is set by the MME 9 to indicate the type of overload procedure required. This message is then sent to the selected base stations 5 including the donor base station 5-1 (S12).

The type of overload procedure requested by the base station 5 is represented by data in the Overload Action IF of the overload start message. As described previously, the different types of overload procedure that a base station 5 may perform comprise:

Rejection of attempts to establish connections for non-emergency mobile originated data transfer;
Rejection of attempts to establish signalling connections; or
Permitting attempts to establish connections for emergency sessions and mobile terminated services.

On receipt of the overload start message the donor base station 5-1 determines what type of overload procedure is required, from the Overload Action IE, and initiates the corresponding overload procedure accordingly for the Direct MTs 3-1 and 3-2 which the overloaded MME 9 serves (S14). The donor base station 5-1 also modifies the overload start message by inserting information identifying the MME source of the overload start message into an MME ID information element in the overload start message and forwards the modified message to the relay node 7 (S16).

On receipt of the overload start message from the donor base station 5-1, the relay node 7 can determine what type of overload procedure is required, from the Overload Action IE and can determine which MME 9 the overload start message relates to from the MME ID IE. The relay node 7 initiates the corresponding overload procedure selectively for the Relay MTs 3-3 to 3-5 that the overloaded MME 9 serves (S18).

Overload Response Termination Procedure

Figure 5:
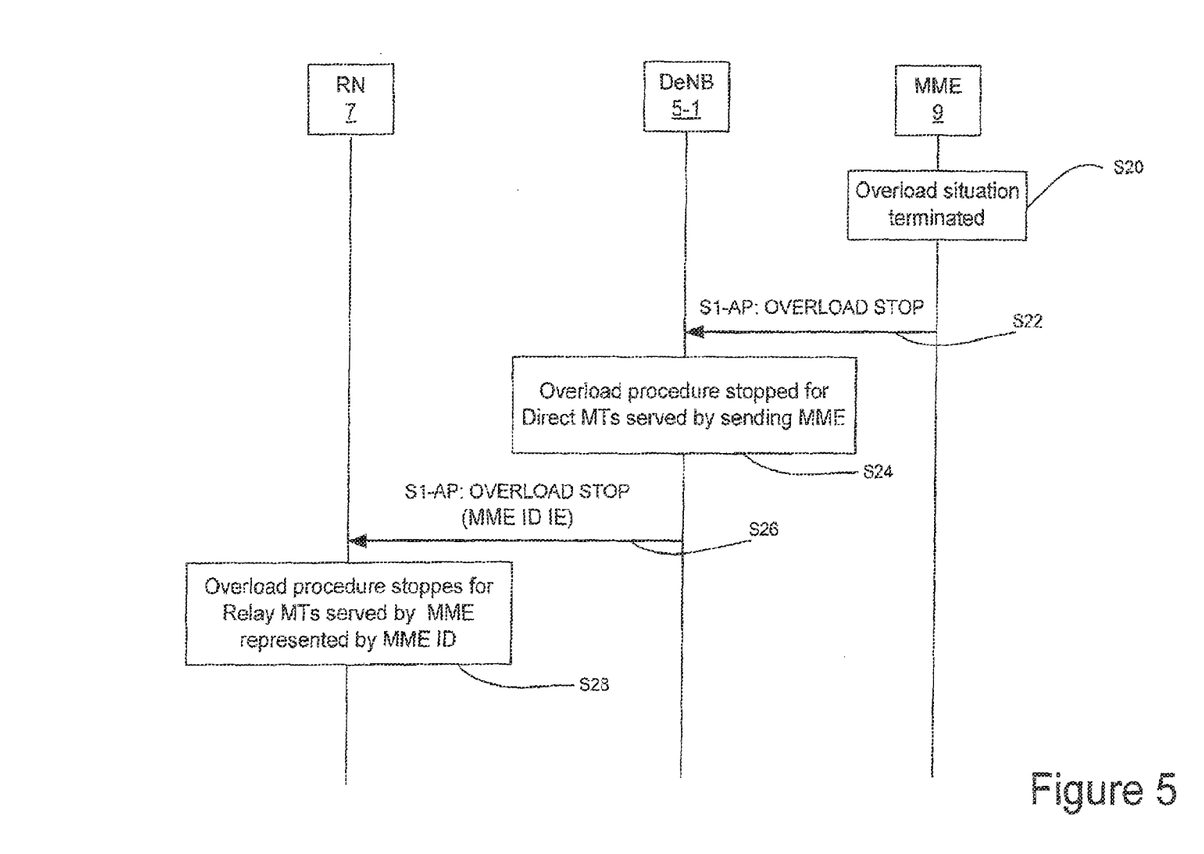
FIG. 5 is a flow diagram illustrating, in general terms, a procedure for terminating a response to an overload situation performed by components of the mobile telecommunication system of FIG. 1.

FIG. 5 illustrates, in general terms, a typical procedure followed by key components of the telecommunication system 1 when an MME 9, that was previously experiencing an overload situation, ceases to be overloaded and requires any overload procedures being performed by the base stations it serves to be discontinued.

As seen in FIG. 5, when the MME 9 determines that the overload situation has terminated (S20), it generates an overload stop message (S1 AP: Overload Stop) and sends it to the base stations 5 performing overload procedures, including the donor base station 5-1 (S22).

On receipt of the overload stop message the donor base station 5-1 stops the corresponding overload procedure accordingly for the Direct MTs 3-1 and 3-2 which the overloaded MME 9 serves (S24). The donor base station 5-1 also modifies the overload stop message by inserting information identifying the MME source of the overload stop message into an MME ID information element and forwards the modified message to the relay node 7 (S26).

On receipt of the overload stop message from the donor base station 5-1, the relay node 7 determines which MME 9 the overload stop message relates to from the MME ID IE. The relay node 7 terminates the corresponding overload procedure being performed for the Relay MTs 3-3 to 3-5 which the MME 9 represented by the MME ID IE serves (S28).

Overload Procedure

Figure 6:
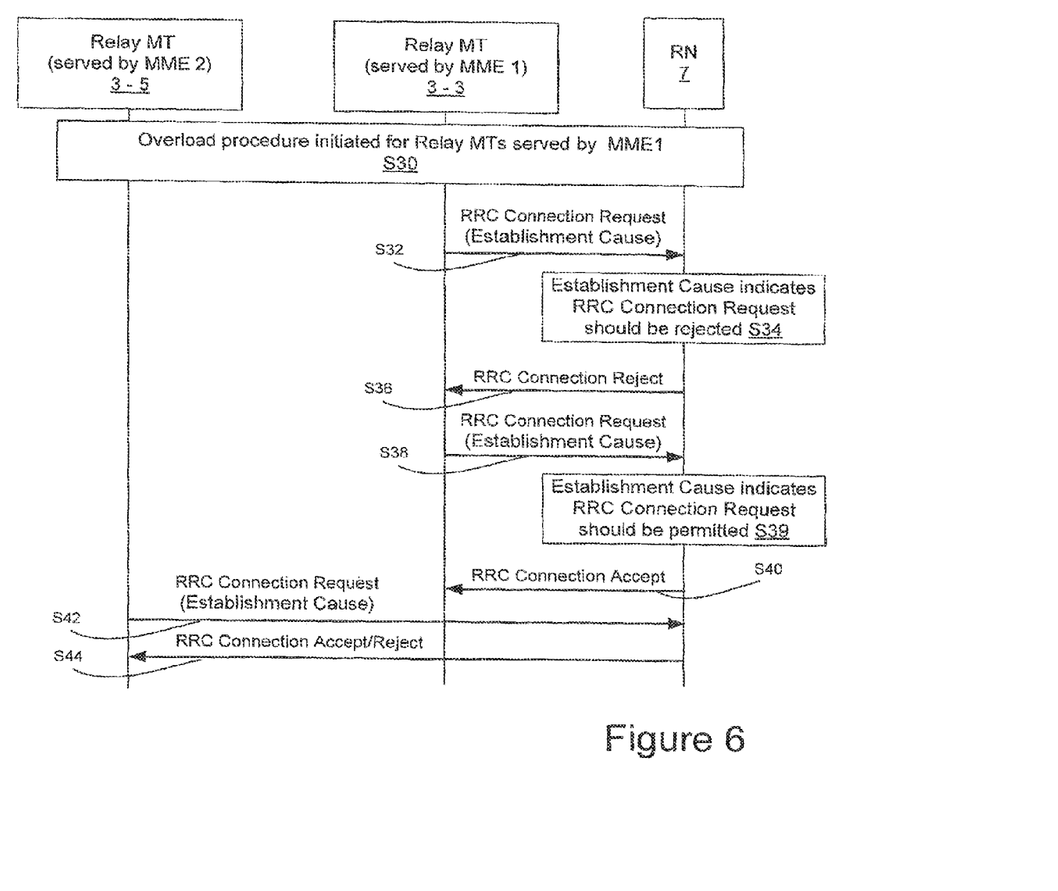
FIG. 6 is a flow diagram illustrating, in general terms, an overload procedure performed by components of the mobile telecommunication system of FIG. 1.

FIG. 6 illustrates, in general terms, an exemplary overload procedure followed by a relay node 7 of the telecommunication system 1 when a specific overloaded MME 9-1 (MME1 in the illustrated example) has requested the overload procedure.

A Relay MT 3-3 served by the overloaded MME 9-1 attempts to establish a connection by generating an RRC connection request and sending it to the relay node 7 (S32, S38). The RRC connection request includes, amongst other information, an establishment cause information element for identifying what the attempted connection establishment is for. The establishment cause information element may, for example, be set to any of the following:

'mo-data'—to indicate that the attempted connection establishment is for a mobile originated (mo) data transfer
'mo-signalling'—to indicate that the attempted connection establishment is for mobile originated (mo) signalling;
'mt-Access'—to indicate that the attempted connection establishment is for a mobile terminated (mt) service;
'emergency'—to indicate that the attempted connection establishment is for an emergency session; or
'highPriorityAccess'—to indicate that the attempted connection establishment is for highPriorityAccess.

The relay node 7 establishes that the Relay MT 3-3 requesting the connection is served by the overloaded MME 9-1 for which the overload procedure has been initiated. If MT 3-3 requesting the connection is served by the overloaded MME 9-1, then the relay node 7 reads the establishment cause IE and determines whether it indicates that the RRC connection request should be rejected or allowed (S34, S39). The relay node 7 then responds to the connection request by generating and sending an RRC connection reject message (if the connection is to be rejected—S36) or an RRC connection accept message (if the connection is to be accepted—S40).

The different overload reject/accept actions for the different overload procedures are summarised below:

Rejection of attempts to establish connections for non-emergency mobile originated data transfer→reject connection attempt if establishment cause is 'mo-data', otherwise permit;

Rejection of attempts to establish signalling connections→reject connection attempt if establishment cause is 'mo-data' or 'mo-signalling', otherwise permit; or Permitting attempts to establish connections for emergency sessions and mobile terminated services→permit connection attempt if establishment cause is 'emergency' or 'mt-access', otherwise reject.

Thus, only signalling traffic corresponding to permitted RRC connections is sent to the overloaded MME 9-1.

When rejecting the RRC connection request for overload reasons the relay node 7 indicates, to the affected Relay MT, the cause of the rejection and an appropriate timer value, for limiting further RRC connection requests within a specified time period.

If the relay node 7 establishes that the Relay MT 3-5 requesting the connection is served by an MME 9-2 for which an overload procedure has not been initiated then, the relay node 7 then accepts (or rejects) the connection request in accordance with LTE standard procedures without regard to the overload procedure initiated for the overloaded MME 9-1.

Accordingly, the relay node 7 is advantageously able to perform the actions required in response to the overload situation being experienced by MME 9-1 for any Relay MT 3-3 served by MME 9-1 without affecting acceptance or rejection of connection requests received from Relay MT 3-5 that is being served by MME 9-2, which is not overloaded.

MODIFICATIONS AND ALTERNATIVES

A detailed embodiment has been described above. As those skilled in the art will appreciate, a number of modifications and alternatives can be made to the above embodiment whilst still benefiting from the inventions embodied therein.

In an alternative embodiment, for example, the donor base station does not forward the overload start (or overload stop) message to the relay node and, accordingly does not inform the relay node that a particular MME has become overloaded. Accordingly, in this embodiment, the relay node 7 will accept an RRC connection request from the Relay MT without regard to any overload procedure requested by the MME 9 which serves the Relay MT. However, the donor base station 5 of this embodiment is operable to detect attempts by a Relay MT being served by an overloaded MME 9 to become active (e.g. to establish communications with another mobile telephone or communications device in the system), and to prevent or allow the attempt in dependence on the reason for the attempt, thereby effectively implementing the requested overload procedure.

In this embodiment, as the skilled person will appreciate, the donor base station 5 is able to identify the reason for the attempt by the Relay MT (served by the overloaded MME) to become active from an RRC establishment cause information element contained in a standard S1 AP Initial UE message sent to it by the relay node. The donor base station then determines if the attempt by the Relay MT to become active should be allowed based on the establishment cause as described previously. If the donor base station decides that the attempt should not be allowed (based on the indication given in the overload action IE of the overload start message) it generates a reply to the S1 AP Initial UE message to terminate the connection with the Relay MT (even though it was accepted by the relay node).

The S1AP Initial IE message is a class 2 procedure and currently a failure message for replying to the S1 AP Initial UE message has not been specified.

A possible reply message that the donor base station may use, to prevent the Relay MT entering the active state comprises an error indication message, receipt of which causes the relay node 7 to release the connection with the affected Relay MT using RRC Connection Release.

Whilst an error indication may be used to allow the donor base station 5 selectively to prevent activation of Relay MTs for overload reasons, it has the following possible issues:

As mentioned above, the RRC connection will already be established by the time the relay node sends the Initial UE message. Thus, this solution does not conform to the principles of the MME overload functionality which, ideally, involves outright rejection of RRC Connection with an appropriate wait timer. Moreover, RRC Connection Release does not contain timer information, to allow the period within which further connection attempts should not be made to be set.

Ideally, error indication should only be used to report detected errors in an incoming message rather than to support the overload functionality.

Accordingly, in an embodiment using an error indication in this way, the donor base station 5 also indicates an associated cause to the relay node 7. On determining that the cause of the error indication is overload related, the relay node 7 can thus set an appropriate timer value to limit further RRC connection requests for an associated time period.

Another possible reply message that the donor base station 5 may use, to prevent the Relay MT entering the active state comprises a UE Context Release message, receipt of which causes the relay node 7 to release the connection with the affected Relay MT using RRC Connection Release.

Whilst a UE context release may be used to allow the donor base station 5 to selectively prevent activation of Relay MTs for overload reasons, it has the following possible issues:

As with use of an 'error indication', the RRC connection will be already established by the time the relay node 7 sends the Initial UE message. Thus, this solution does not conform to the principles of the MME overload functionality which, ideally, involves outright rejection of RRC Connection with an appropriate wait timer. Moreover, RRC Connection Release does not contain timer information, to allow the period within which further connection attempts should not be made to be set.

The purpose of the UE Context Release procedure is to enable an MME to order the release of a UE-associated logical connection due to various reasons. However, the UE-associated logical connection is not fully established at the time the donor base station 5 receives the Initial UE message.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc. As those skilled in the art will appreciate, it is not essential that the above described relay system be used for mobile communications devices. The system can be used to extend the coverage of base stations in a network having one or more fixed computing devices as well as or instead of the mobile communicating devices.

In the above description, the donor base station 5-1 and the relay node 7 are described, for ease of understanding, as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Where a plurality of MMEs become (or cease to be) overloaded, a list of MME identifiers may be provided in the associated overload start (or overload stop) message.

Whilst modifying the overload messages to include information identifying the source of the overload message and forwarding the modified message to the relay node is advantageous in terms of simplicity, ease of implementation and minimising the number of messages required, the information identifying the source of the overload message may be sent in any of a number of different ways. The information may, for example, be sent in a separate message either before or after the overload message is forwarded. Moreover, instead of modifying and forwarding a received overload message, a completely new message may be generated which includes the information identifying the source of the overload message and any information required to initiate/terminate the associated overload procedures.

While it is beneficial, in terms of ease of implementation, for the base station to insert an MME's identity into the overload start or stop message, it will be appreciated that an MME sending overload message may insert its own identity into the overload message prior to sending it to the selected base stations.

In the embodiments described above, the relay station and the base station will each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits. Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1 INTRODUCTION

The objective of the paper is to analyse how the MME Overload function works in an RN deployment scenario. The paper highlights related issues and analyse different solution (e.g. MME Overloading terminating to DeNB or RN). Also the paper highlights pros and cons of the different solution and it propose a way forward accordingly.

2 BACKGROUND

MME Overload

The MME Overload procedure was introduced to control overload situation in MME. When MME experience an overload situation, it will randomly choose some eNBs towards which the MME Overload procedure is sent. The MME will indicate to the eNB which action should eNB undertake upon overload indication.

Depending on the Overload Action IE in S1AP overload start, eNB shall
    "reject all RRC connection establishments for non-emergency mobile originated data transfer" (i.e. reject traffic corresponding to RRC cause "mo-data"), or
    "reject all RRC connection establishments for signalling" (i.e. reject traffic corresponding to RRC cause "mo-data" and "mo-signalling"), or
    "only permit RRC connection establishments for emergency sessions and mobile terminated services" (i.e. only permit traffic corresponding to RRC cause "emergency" and "mt-Access").

When rejecting an RRC connection request for overload reasons the eNB indicates to the UE an appropriate timer value that limits further RRC connection requests for a while [1].

MME Pool and RN Deployment

According to the agreed Relay architecture, DeNB will be seen as an MME from RN view. As a consequence RN will not have any knowledge on which MME has triggered a certain non UE associated procedure.

3 DISCUSSION

Figure 7:
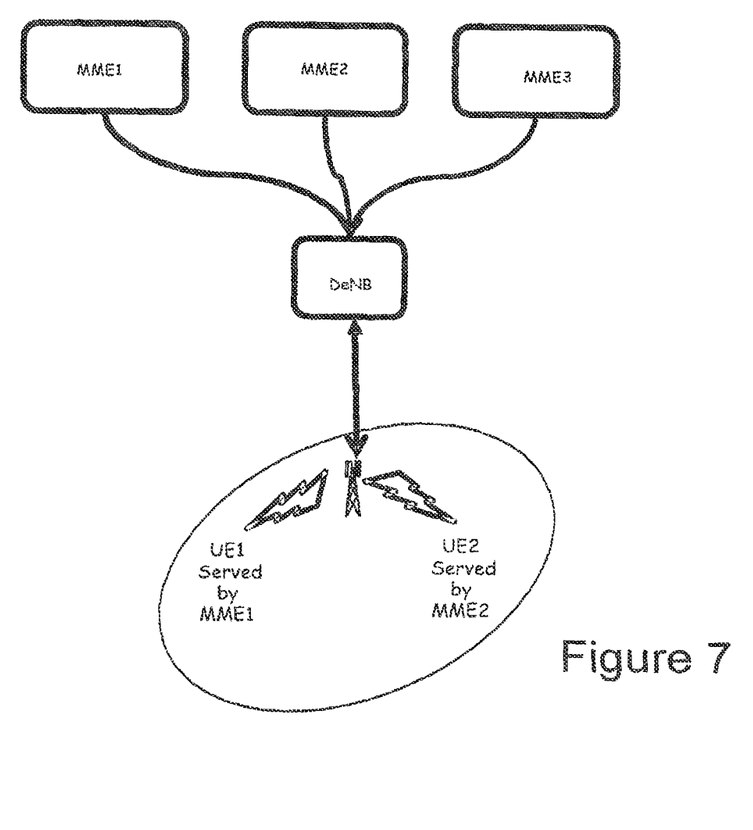
FIG. 7 is a simplified overview of a mobile telecommunication system of a type to which the described embodiments are applicable.

In FIG. 7, RN is serving UE1 and UE2: UE1 is being served by MME1 and UE2 is being served by MME2. Assuming MME1 will get overloaded, it will send an Overload message to DeNB. DeNB need to take action upon reception of S1 AP Overload start e.g. reject the RRC connection with establishment cause as indicated by the MME.

During the overload situation, the affected UEs being served by the RN need to be handled as well. Different solutions are discussed below:
    DeNB does not inform the RN that a certain MME is overloaded. This means that it is up to the DeNB to reject any UE attempt to go to active state if the UE is being served by the overloaded MME and the cause for going to active is in line with the indication given by the overloaded MME. The DeNB will be aware about the reason of the RRC connection establishment request from the RRC Establishment cause IE in S1AP Initial UE message. However, the S1AP Initial UE message is a class 2 procedure and a failure message is not specified. Two possible reply are considered below.
    Error Indication
        Problem in using Error indication
            The RRC connection will be already established by the time the RN sends the Initial UE message. Thus this solution is not in line with the principles of the MME Overload functionality which foresee the rejection of RRC Connection with an appropriate wait timer. RRC Connection Release does not contain the wait timer information.

Error indication should only be used when to report detected errors in one incoming message and not as support to CP functionality e.g. Overload function If it will be decided to go for Error Indication, text procedure would be needed to clarify that the DeNB need to indicate appropriate cause so that RN can an appropriate timer value that limits further RRC connection requests for a while.

UE Context Release

Problems in using UE Context Release

The RRC connection will be already established by the time the RN send the Initial UE message (same problem as for the error indication). Thus this solution is not in line with the principles of the MME Overload functionality which foresee the rejection of RRC Connection with an appropriate wait timer. RRC Connection Release does not contain the wait timer information.

The purpose of the UE Context Release procedure is to enable the MME to order the release of the UE-associated logical connection due to various reasons. However the LIE associated logical connection is not yet established at the time DeNB receives the Initial Ue message [2].

DeNB forward the Overload message to the RN

Possible problem the RN does not know which MME is currently overloaded and it may end up rejecting unnecessarily all attempted RRC Connections establishment e.g. it may end up reject RRC Connection establishment from both UE1 and UE2 when actually just MME2 is overloaded (FIG. 2).

Solution

In order to overcome this issue, the DeNB should indicate to the RN which MME is overloaded when forwarding the S1 AP overload start and Overload stop. This information may also be useful in case e.g. two MME gets overloaded (via allowing parallel procedure in Uu or list of MME id in the S1AP Overload messages)

Proposals:

It is proposed that the overload messages are forwarded by the DeNB to the RN

It is proposed to add a new optional IE In S1 AP overload related messages so that RN is able to identify the affected RRC connection request.

4 CONCLUSION

This paper has analysed issues related to the MME Overload function in case of RN deployment. It is proposed to discuss the paper and agree on the proposal in chapter 3.

5 REFERENCE

[1] 23.401: General Packet Radio Service (GPRS) enhancements for Evolved Universal Terrestrial Radio Access Network (E-UTRAN) access
[2] 36.401: Evolved Universal Terrestrial Radio Access Network (E-UTRAN); Architecture description This application is based upon and claims the benefit of priority from United Kingdom patent application No. 1013559.8, filed on Aug. 12, 2010, the disclosure of which is incorporated herein in its entirety by reference.

The invention claimed is:

1. A relay node for a communication system, the relay node comprising:
   a controller; and
   a receiver configured to receive, from a donor base station, an overload message including information representing an identity of at least one overload affected core network node;
   wherein the controller is configured to use the information representing the identity of the overload affected core network node to identify to which traffic an overload procedure represented by said overload message is applied and to apply said overload procedure.

2. A relay node as claimed in claim 1 wherein the overload message comprises at least one of an overload start and an overload stop message.

3. A relay node as claimed in claim 1 wherein the information representing an identity of at least one overload affected core network node comprises information identifying a mobility management entity (MME).

4. A relay node as claimed in claim 1 wherein the overload procedure comprises rejecting a connection establishment and wherein said controller is arranged to use the information representing the identity of the overload affected core network node to identify to which traffic the rejection is applied.

5. A relay node as claimed in claim 4 said controller is arranged to identify a reason associated with the connection establishment request and wherein rejecting a connection establishment is dependent on said reason.

6. A non-transitory computer-readable medium comprising computer implementable instructions for causing a programmable computer device to become configured as the relay node of claim 1.

7. A donor base station for a communication system, the donor base station comprising:
   a receiver configured to receive, from an overload affected core network node, an overload message;
   a controller configured to generate identity information representing an identity of the overload affected core network node and including said generated identity information in said overload message; and
   a transmitter configured to transmit, to a relay node, the overload message including the information representing an identity of the overload affected core network node.

8. A donor base station as claimed in claim 7 wherein the overload message comprises at least one of an overload start and an overload stop message.

9. A donor base station as claimed in claim 7 wherein the identity information comprises information identifying a mobility management entity (MME).

10. A donor base station as claimed in claim 7 wherein said overload message represents an overload procedure, wherein the overload procedure comprises rejecting a connection establishment.

11. A non-transitory computer-readable medium comprising computer implementable instructions for causing a programmable computer device to become configured as the base station of claim 7.

12. A method performed by a relay node in a communication system, the method comprising:
   receiving, from a donor base station, an overload message including information representing an identity of at least one overload affected core network node;

using the information representing the identity of the overload affected core network node to identify to which traffic an overload procedure represented by said overload message is applied and to apply said overload procedure accordingly.

13. A method performed by a donor base station in a communication system, the method comprising:
receiving, from an overload affected core network node, an overload message;
generating identity information representing an identity of the overload affected core network node and including said generated identity information in said overload message; and
transmitting, to a relay node, the overload message including the information representing an identity of the overload affected core network node.

* * * * *